United States Patent
Yu et al.

(10) Patent No.: US 9,912,623 B2
(45) Date of Patent: Mar. 6, 2018

(54) SYSTEMS AND METHODS FOR ADAPTIVE CONTEXT-AWARE CONTROL OF MULTIMEDIA COMMUNICATION SESSIONS

(71) Applicant: General Electric Company, Schenectady, NY (US)

(72) Inventors: Bo Yu, San Ramon, CA (US); Piyush C. Modi, San Ramon, CA (US); Joseph William Bolinger, San Ramon, CA (US); Aravind Kumar Mikkilineni, San Ramon, CA (US); Yoshifumi Nishida, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 258 days.

(21) Appl. No.: 14/598,828

(22) Filed: Jan. 16, 2015

(65) Prior Publication Data

US 2016/0212074 A1 Jul. 21, 2016

(51) Int. Cl.
*G06F 15/16* (2006.01)
*H04L 12/58* (2006.01)
(Continued)

(52) U.S. Cl.
CPC ........ *H04L 51/063* (2013.01); *H04L 12/1813* (2013.01); *H04L 12/1822* (2013.01);
(Continued)

(58) Field of Classification Search
CPC . H04L 51/063; H04L 51/046; H04L 12/1813; H04L 65/1006; H04L 65/1069;
(Continued)

(56) References Cited

U.S. PATENT DOCUMENTS 7,123,707 B1 * 10/2006 Hiri ................... H04L 29/06027
379/215.01
7,388,850 B2 6/2008 Ochi et al.
(Continued)

FOREIGN PATENT DOCUMENTS

CA 2599176 A1 9/2006
CN 100566340 C 12/2009
(Continued)

OTHER PUBLICATIONS

Gong et al., "A Knowledge-Based Mediator for Dynamic Integration of Heterogeneous Multimedia Information Sources", Intelligent Multimedia, Video and Speech Processing, Proceedings of 2004 International Symposium on, pp. 467-470, Oct. 20-22, 2004.
(Continued)

*Primary Examiner* — Moustafa M Meky
*Assistant Examiner* — Blake Rubin
(74) *Attorney, Agent, or Firm* — Buckley, Maschoff & Talwalkar LLC (57) ABSTRACT

A system to adaptively control multimedia communication sessions includes a mediator unit in an intermediary communication position between two or more remote clients and a media infrastructure. The mediator unit includes a receiver, a transmitter and a control processor that controls the receiver and the transmitter. The mediator unit communicates remote clients across a communication network, where the first client initiates a communication session and the mediator unit assigns a unique session identifier to the communication message. Additional remote clients send join requests including the unique session identifier, and the mediator unit acts as a back-to-back user agent to pass messages between two remote clients of a two-client communication session. The control processor configured to execute predefined context-sensitive strategies including the
(Continued)

number of remote clients in the communication session, bridging incompatible peer-to-peer communications, supporting multiple devices of a single remote client, and dynamic allocation of multipoint control unit resources.

14 Claims, 7 Drawing Sheets (51) Int. Cl.
H04L 29/08 (2006.01)
H04L 12/18 (2006.01)
H04L 29/06 (2006.01)
H04N 7/15 (2006.01)

(52) U.S. Cl.
CPC ........ H04L 51/046 (2013.01); H04L 65/1006 (2013.01); H04L 65/1069 (2013.01); H04L 65/403 (2013.01); H04L 65/80 (2013.01); H04L 67/104 (2013.01); H04L 67/146 (2013.01); H04L 67/20 (2013.01); H04L 69/24 (2013.01); H04N 7/152 (2013.01); H04L 12/1827 (2013.01)

(58) Field of Classification Search
CPC ..... H04L 65/403; H04L 65/80; H04L 67/104; H04L 67/146; H04L 69/24; H04L 7/152
See application file for complete search history.

(56) References Cited

U.S. PATENT DOCUMENTS

| 7,953,867 | B1* | 5/2011 | Andreasen | H04L 65/1006 709/203 |
|---|---|---|---|---|
| 8,166,176 | B2 | 4/2012 | Kumar et al. | |
| 8,406,290 | B2 | 3/2013 | Li et al. | |
| 8,503,639 | B2 | 8/2013 | Reding et al. | |
| 8,644,822 | B1 | 2/2014 | Phillips et al. | |
| 8,649,424 | B2 | 2/2014 | Kalra et al. | |
| 2005/0073997 | A1* | 4/2005 | Riley | H04L 29/06027 370/352 |
| 2005/0237952 | A1* | 10/2005 | Punj | H04L 12/1813 370/260 |
| 2006/0077959 | A1* | 4/2006 | Beckemeyer | H04L 29/12103 370/352 |
| 2006/0189340 | A1* | 8/2006 | Sung | H04W 84/08 455/518 |
| 2008/0037752 | A1* | 2/2008 | Chatilov | H04L 65/1006 379/202.01 |
| 2008/0132215 | A1 | 6/2008 | Soderstrom et al. | |
| 2009/0063690 | A1 | 3/2009 | Verthein et al. | |
| 2009/0097471 | A1* | 4/2009 | Qiu | H04L 12/66 370/352 |
| 2009/0172170 | A1* | 7/2009 | Rey | H04L 29/06027 709/227 |
| 2009/0327499 | A1* | 12/2009 | Strickland | H04M 7/0072 709/228 |
| 2010/0008232 | A1* | 1/2010 | Zave | H04M 3/4217 370/241 |
| 2010/0030694 | A1* | 2/2010 | Britsch | G06Q 20/382 705/64 |
| 2010/0142413 | A1* | 6/2010 | Eriksson | H04L 12/1818 370/261 |
| 2011/0032931 | A1* | 2/2011 | Zhu | H04W 76/027 370/357 |
| 2011/0075653 | A1* | 3/2011 | Potts | H04L 65/1069 370/352 |
| 2011/0113141 | A1* | 5/2011 | Veenstra | H04L 63/123 709/226 |
| 2011/0182416 | A1* | 7/2011 | Kramarenko | H04M 3/42314 379/207.02 |
| 2011/0200094 | A1 | 8/2011 | Kalra et al. | |
| 2011/0258203 | A1 | 10/2011 | Wouhaybi et al. | |
| 2012/0167208 | A1* | 6/2012 | Buford | H04L 63/1491 726/22 |
| 2013/0031192 | A1 | 1/2013 | Caspi | |
| 2013/0173812 | A1* | 7/2013 | Ezell | H04L 65/1016 709/228 |
| 2013/0201280 | A1* | 8/2013 | Shen | H04N 7/147 348/14.12 |
| 2013/0212242 | A1* | 8/2013 | Mendiratta | H04L 65/1069 709/223 |
| 2014/0049603 | A1* | 2/2014 | Wang | H04N 19/597 348/43 |
| 2014/0289420 | A1* | 9/2014 | Tarricone | H04L 45/02 709/227 |

FOREIGN PATENT DOCUMENTS

| EP | 2 186 310 B1 | 7/2011 |
|---|---|---|
| EP | 2629477 A1 | 8/2013 |
| WO | 2013/060567 A1 | 5/2013 |

OTHER PUBLICATIONS

Hossain et al., "Seamless SIP Multimedia Session Transfer on Ipv6 Network Via Device Switching", Modeling, Simulation and Applied Optimization (ICMSAO), 2011 4th International Conference on, pp. 1-7, Apr. 19-21, 2011, Kuala Lumpur.

A Partial International Search Report issued in connection with corresponding Application No. PCT/US2016/012405 dated Mar. 31, 2016.

* cited by examiner

SYSTEMS AND METHODS FOR ADAPTIVE CONTEXT-AWARE CONTROL OF MULTIMEDIA COMMUNICATION SESSIONS

BACKGROUND

Videoconferencing systems allow two or more locations to communicate across duplex (i.e., simultaneous, two-way) audio and video channels. The availability of low cost, high capacity broadband services supported by powerful processors capable of sophisticated compression algorithms has led to the widespread use of videoconferencing in a wide variety of communications—personal, business, education, government, etc.

A multipoint control unit (MCU) is a device that is used to interconnect, or bridge, three or more remote clients (terminals, workstations, gateways, etc.) into one simultaneous videoconference session. among three or more remote points is possible by means of a Multipoint Control Unit (MCU). This is a bridge that interconnects calls from several sources (in a similar way to the audio conference call).

The MCU can be located at an endpoint of a local area network (LAN). The MCU can collect bandwidth capability data for each of the remote clients of a videoconference. The MCU then configures the session to meet the capability of the least powerful remote client to assure that the videoconference is of the best quality for each participant.

An MCU can be a stand-alone device or it can be embedded into dedicated videoconferencing units. At a high-level, the MCU can be viewed as including two components, a single multipoint controller (MC), and one or more multipoint processors (MP), sometimes referred to as the mixer.

The MC controls the conferencing while it is active on the signaling plane—managing conferencing creation, endpoint signaling and in-conferencing controls. The MC can negotiate parameters with every endpoint in the network and control conferencing resources. The MP(s) operate on the media plane and receive media from each endpoint, and then generates output streams from each endpoint and redirects the information to other endpoints in the conference.

Digital compression of audio and video streams in real time is performed by a coder/decoder (codec). The compressed digital stream can be subdivided into labeled packets, which are then transmitted through an electronic communication network under a known protocol.

BRIEF DESCRIPTION OF THE DRAWINGS

FIGS. 3A-3C depict a flow diagram of an allocation process in accordance with some embodiments; and.

DETAILED DESCRIPTION

In accordance with embodiments, systems and methods provide a context-aware framework for adaptively controlling multimedia communication sessions. Embodying systems and methods provide a mediator unit that is an intermediary entity located between a remote client and the underlying media infrastructure. The mediator unit mediates communication between the remote clients and the media infrastructure.

Figure 1A:
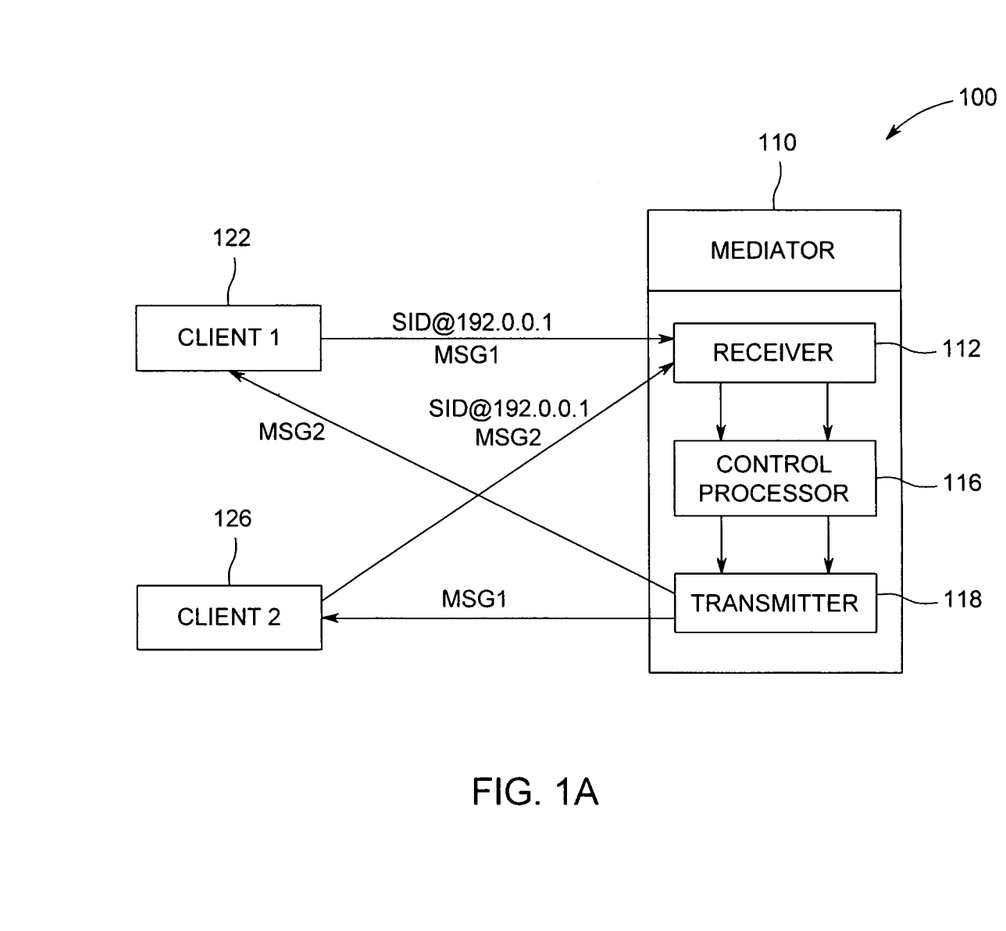
FIGS. 1A-1B depict a system in accordance with some embodiments.

FIG. 1A depicts system 100 during a two-client communication phase in accordance with some embodiments. System 100 can include mediator unit 110 that can include receiver 112, transmitter 118, and control processor 116. In some implementations, receiver 112 and transmitter 118 can be separate units within mediator unit 110 as depicted. In other implementations, the receiver and transmitter can be structured as a transceiver. The receiver and transmitter are operated under the control of control processor 116.

For purposes of description, during the two-client communication phase system 100 includes two remote clients—client1 122 and client2 126. However, system 100 is not limited to a two-client communication session, and other numbers of remote clients can be implemented. In accordance with implementations, the remote clients transmit communication messages to the mediator unit, which then routes the messages to the proper destination(s). In conventional communication systems, an intermediary entity merely acts as a proxy to simply exchange communication messages between remote clients. However, embodying mediator units have a proactive role in the process and manage communication sessions based on contextual information regarding the remote clients and media infrastructure. The contextual information can include, but is not limited to, network bandwidth, numbers of clients, codecs, and content being communicated. By way of example, contextual information can also include the nature of a video conference's content can be used by the mediator to process and manage a communication session. For example, if the video conference is sharing a video of a manufacturing part inspection versus video conferencing of individuals, different codecs or parameters can be chosen by the mediator to optimize the session. Another example of contextual information that the mediator unit can use is if one client is streaming a PowerPoint presentation, the mediator could potentially automatically detect long static images and switch to a much lower frame rate. The frame rate can then be increased by the mediator when dynamic images are later detected (e.g., video playback, or participant interaction). In another non-limiting example of contextual information used by the mediator, the mediator unit's proactive role can include, but is not limited to, (1) automatically convert a peer-to-peer connection to an MCU connection; (2) automatically perform media transcoding when the clients support different codes; and (3) allow a user to switch devices without dropping current communication session. Embodying MCUs make these proactive role decisions based on contextual cues, which cannot be done by a conventional MCU.

Mediator 110 accesses various contextual knowledge regarding participating communication entities, such as the server(s) supporting the communication network, the remote clients, the surrounding network environment, etc. The information is collected and stored at the mediator unit. Some of it is statically stored, such as network topology, but some is dynamically collected from the environment (e.g. network bandwidth), or from the user client (e.g. number of clients in the session, locations of the clients). The MCU uses knowledge included in the client's session description protocol (SDP), such as client's IP address, port number, media codec, etc. This contextual knowledge is used to provide adaptive, flexible, intelligent, context-aware communications without requiring complex modifications to the remote clients. In accordance with embodiments, because the MCU has such intelligence built in, the clients are freed from certain network connection chores and overhead—for example, in embodying systems clients do not need to handle redial when switching devices, calling a different number when more than two participants join the communication session, or switch codecs when clients on incompatible platforms (e.g., VP8 video compression, virtual synchrony systems, H264 compression format, etc.) join the communication session.

By having knowledge about the number of clients in each communication session, the media codecs supported by each client at the mediator, system resource allocation of the MCU and/or media transcoder can be optimized. Each client supports a predetermined set of media codecs. When the client calls into the session, it provides its list of supported codecs in their SDP.

The mediator unit reviews the supported codecs of the clients in the communication session to identify a common codecs among clients. If they all share at least one codec, mediator exchange SDP by using the common one, so transcoder is not needed. If there is no common codecs, the mediator will allocate transcoder to bridge the video streaming. Further, the mediator can have its own list of supported codecs, which can include the client codecs.

Mediator 110 is configured to detect changes in the remote client address (e.g., reconnect to the session using a different user ID (e.g. SIP address), reconnection at another URL, etc.) and/or changes in the device instrumentation itself (e.g., from a terminal to a smart phone, vice versa, and any other instrumentation change).

The mediator unit provides seamless mobility support of the communication session when a remote client changes location from one place to another. As the remote client changes location, the network address used for communication can be changed. Under conventional systems if each client is directly connected to the other, the session has to be terminated and be re-established with a new address. According to embodiments, an embodying mediator unit allows remote clients to keep a communication session active even though the network address is changed. Embodying mediator units maintain the session state, as opposed to the conventional approach of the session state being maintained on each client side. When a user drops connection, the session/client state is still maintained by the mediator. Accordingly, when the user re-joins the session the state will be recovered by the mediator. Under this process, other participants in the same session are not impacted.

The mediator unit provides a smooth user experience by routing messages to the new address and/or changing to communication protocols and/or formats suitable for the new remote client device without dropping current sessions.

Figure 1B:
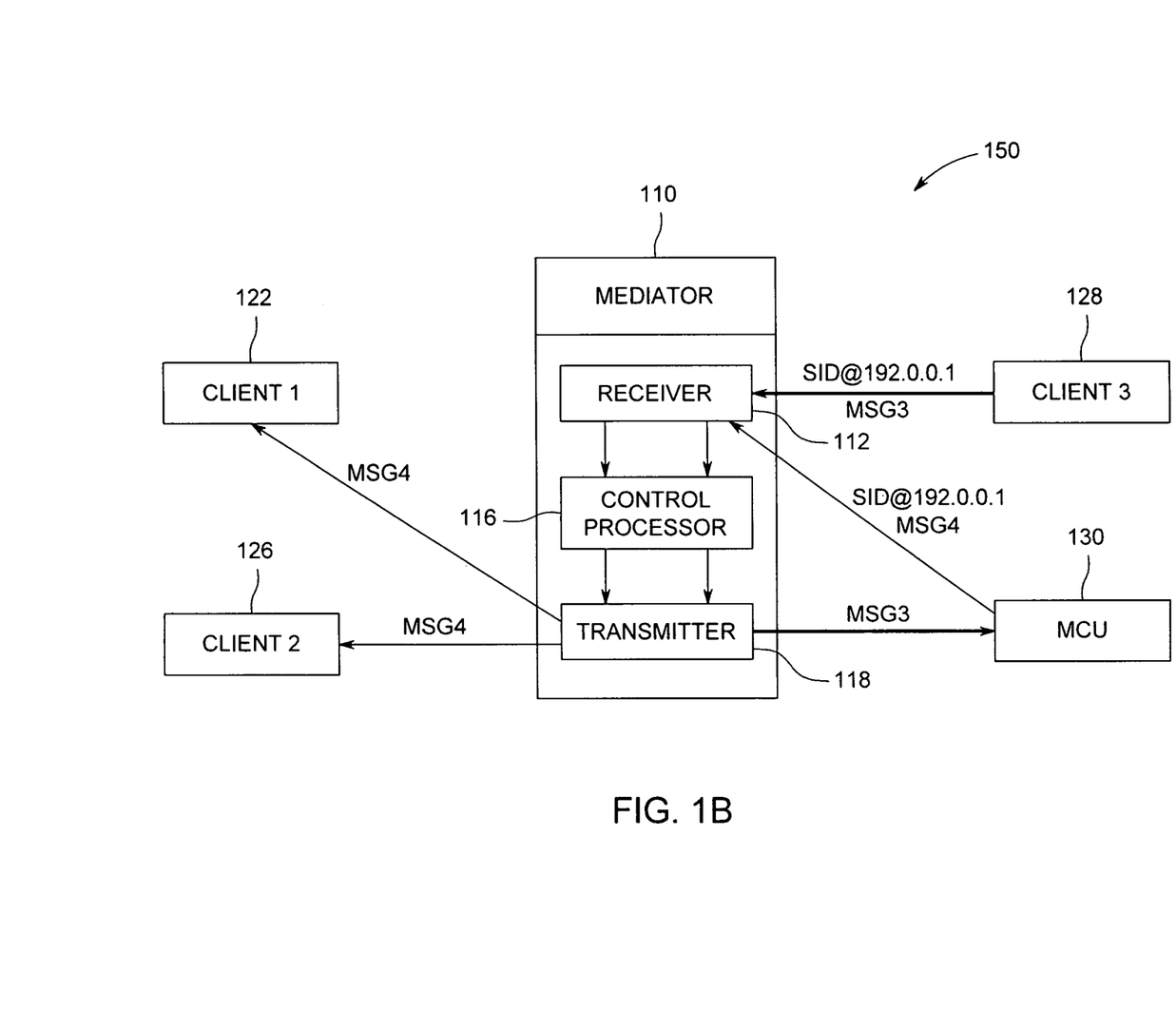

In accordance with embodiments, the basic unit of communication is defined as a communication session started by one, or more, of remote clients 122, 126, 128. At the start of a communication session a unique session ID (SID) is assigned by the mediator unit when it receives a new session request from the client(s). This unique SID is used to identify the session by all participating clients. Each remote client who wants to join the communication session sends a join request with the session ID to mediator unit 110. Control processor 116 within the mediator unit processes the join requests, and messages. The actions taken by the control processor is based on contextual knowledge. In accordance with embodiments, this contextual knowledge can be of the participating clients, or content of the message, or other contextual information. The relevancy of the information's content is determined based on the use case.

Receiver 112 receives communications messages from the remote client(s). Receiver 112 parses SID information of the communication and identifies the communication session to which the communication message belongs. Control processor 116 executes algorithms of predefined context-sensitive strategies to determine what action the mediator unit is to undertake in handling the communication message. Based on the determination results of the control processor, transmitter 118 transmits appropriate responses and/or requests to the remote client(s).

FIG. 1B depicts system 150 that includes client3 128, as a third client joining the session depicted in FIG. 1A, to create a multi-client communication phase in accordance with some embodiments. FIGS. 1A-1B illustrate a simple example of how communication requests, in the form of SIP messages, from remote client(s) are processed differently by the mediator unit based on different contexts. For purposes of this example, the context is simply the number of clients. In the beginning (phase 1) (FIG. 1A) there are two clients in the session. Later a third client joins the session (phase 2) (FIG. 1B). During the second phase, where for purposes of explanation the context is based on the number of participants, the mediator automatically switch to a MCU session. For example, in a session identified "SID", all clients send their SIP messages to the mediator unit with "SID" as part of the destination SIP address. By parsing the SIP address, the mediator knows that the clients participate in the session identified by "SID." During phase 1, because there are only two clients in the session, they support the same media codec. Hence, the mediator unit performs the role as a back-to-back user agent to pass messages through to each of the two remote clients in the session.

Later, third client (client3 128) joins the same session by sending SIP messages with the same "SID", the mediator determines that there are more than two clients in the same session (now in phase 2). Therefore, the mediator unit directs all SIP messages with SID "SID" in the destination SIP address to MCU 130. The MCU then handles communication between the three or more remote clients participating in the session. According to embodiments, these strategies adaptively mediate communication sessions by using different kinds of contextual knowledge in the context of SIP-based communication.

The predefined context-sensitive strategies implemented by control processor 116 can include, but are not limited to, bridging incompatible peer-to-peer (P2P) communication; dynamic allocation of MCU resources based on the number of participants; and supporting multiple devices of a remote client.

Figure 2:
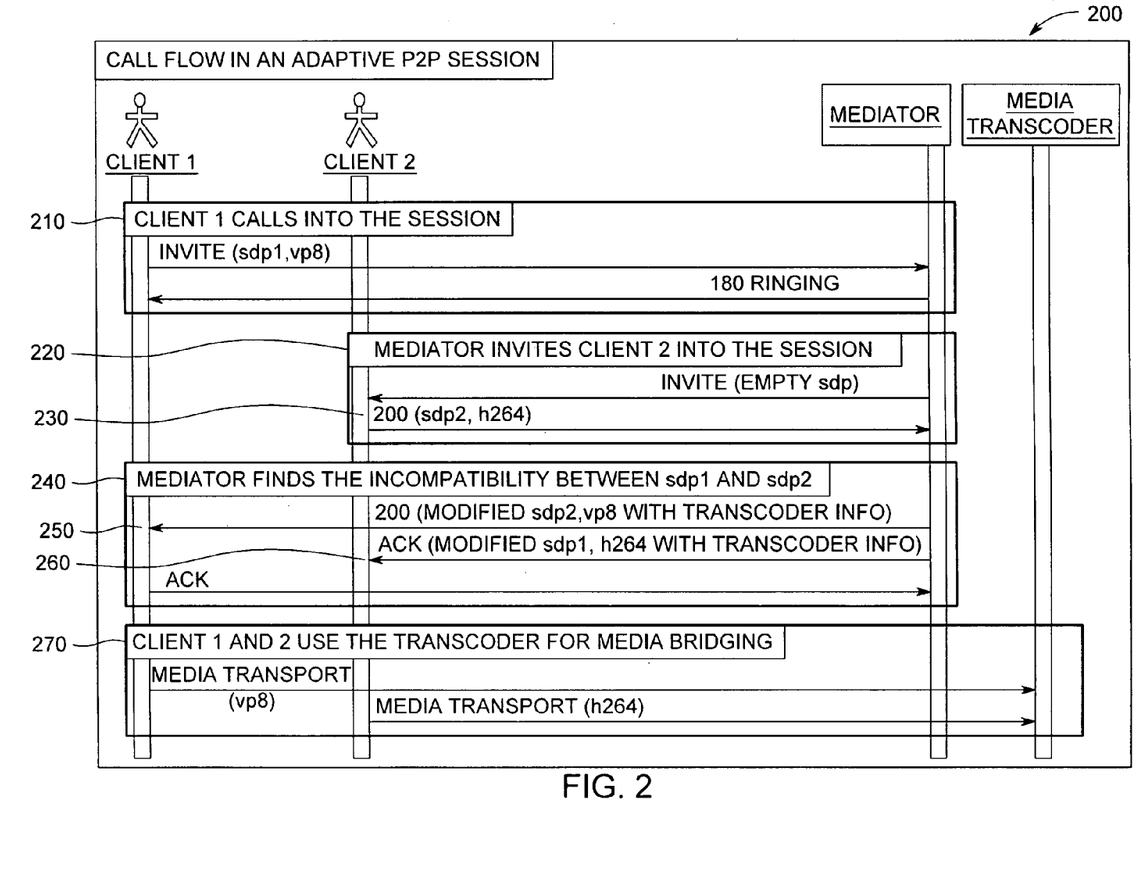
FIG. 2 depicts a flow diagram of a bridging process in accordance with some embodiments.

FIG. 2 depicts a flow diagram of bridging process 200 for bridging incompatible P2P entities in accordance with some embodiments. Bridging process 200 is applicable in peer-to-peer sessions whenever the incompatibility of supported media codec between peers is detected. In accordance with embodiments, the session description protocol (SDP) negotiation will be modified by mediator unit 110 to use a media transcoder. A remote client calls into a P2P session, step 210, via the mediator unit. The mediator unit sends an INVITE with an empty SDP, step 220, to get a response from the second remote client. This step is done instead of forwarding the INVITE request with the first remote client's SDP (sdp1). The second remote client responds with its own SDP (sdp2), step 230.

The mediator parses the content of the two SDP messages it has received (the INVITE from remote client 1, and the response from remote client 2), to check the compatibility (and/or whether there is an incompatibility) between the two remote clients, step 240. If an incompatibility between the two remote clients is uncovered (i.e., a common media codec cannot be found), the mediator sends a modified response, step 250, to the first remote client.

This modified response includes the media transcoder's media information as the SDP answer. Meanwhile, the mediator sends the ACK to the second remote client, step 260, with the media transcoder's media information. In this way, the P2P communication between the two remote clients is bridged, step 270, using the media transcoder, without the media transcoder involved in the communication initialization.

Figure 3A:
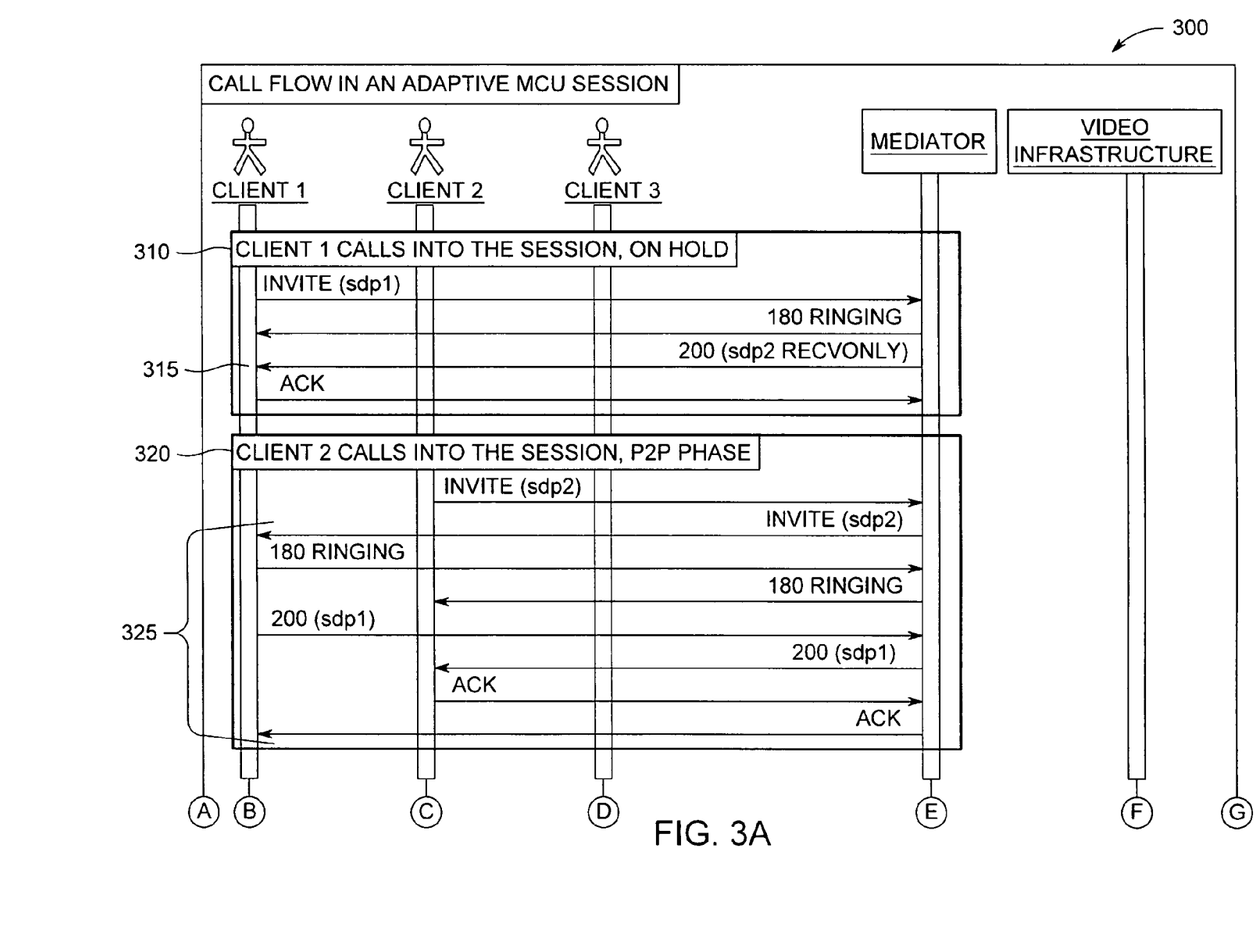
Figure 3B:
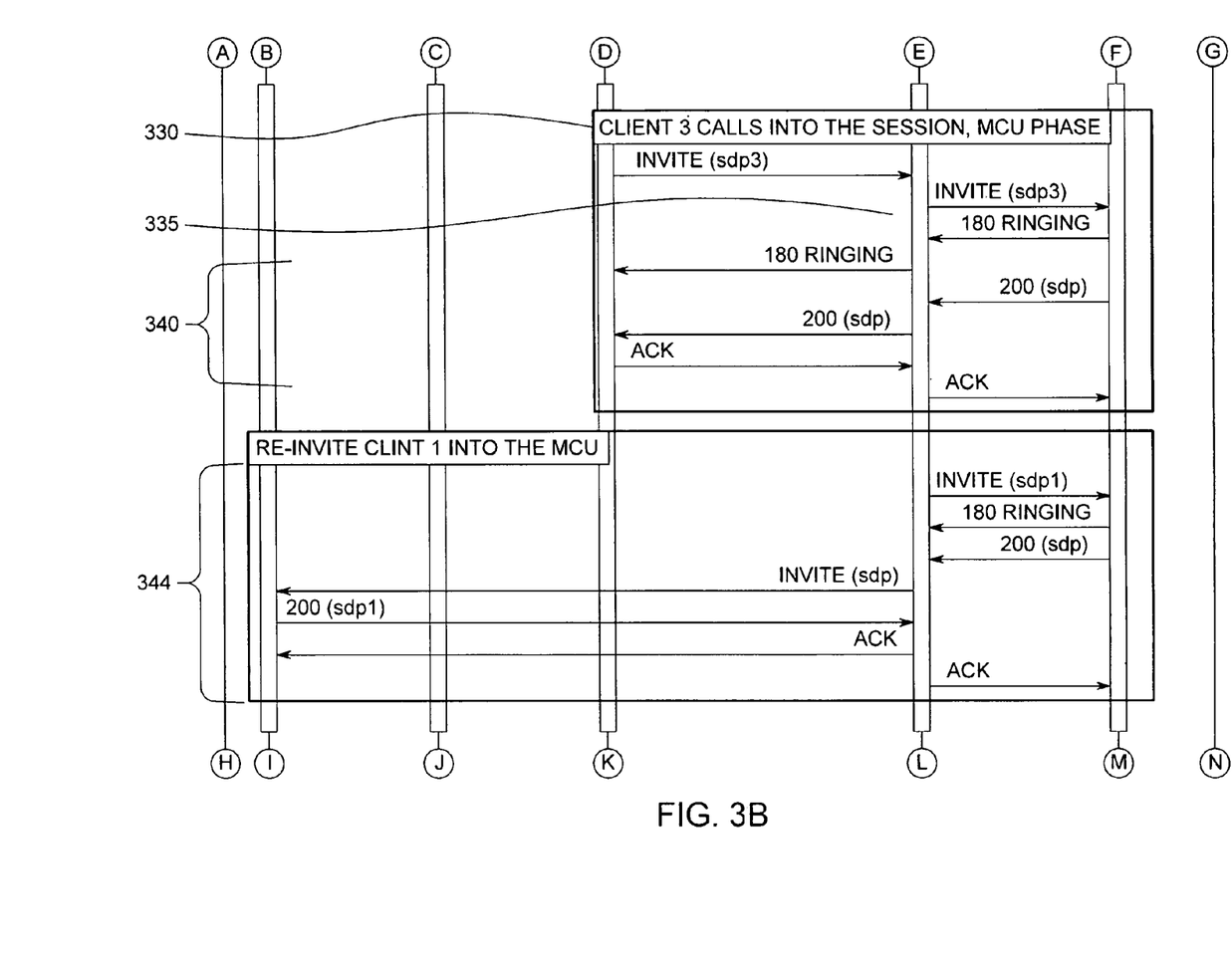
Figure 3C:
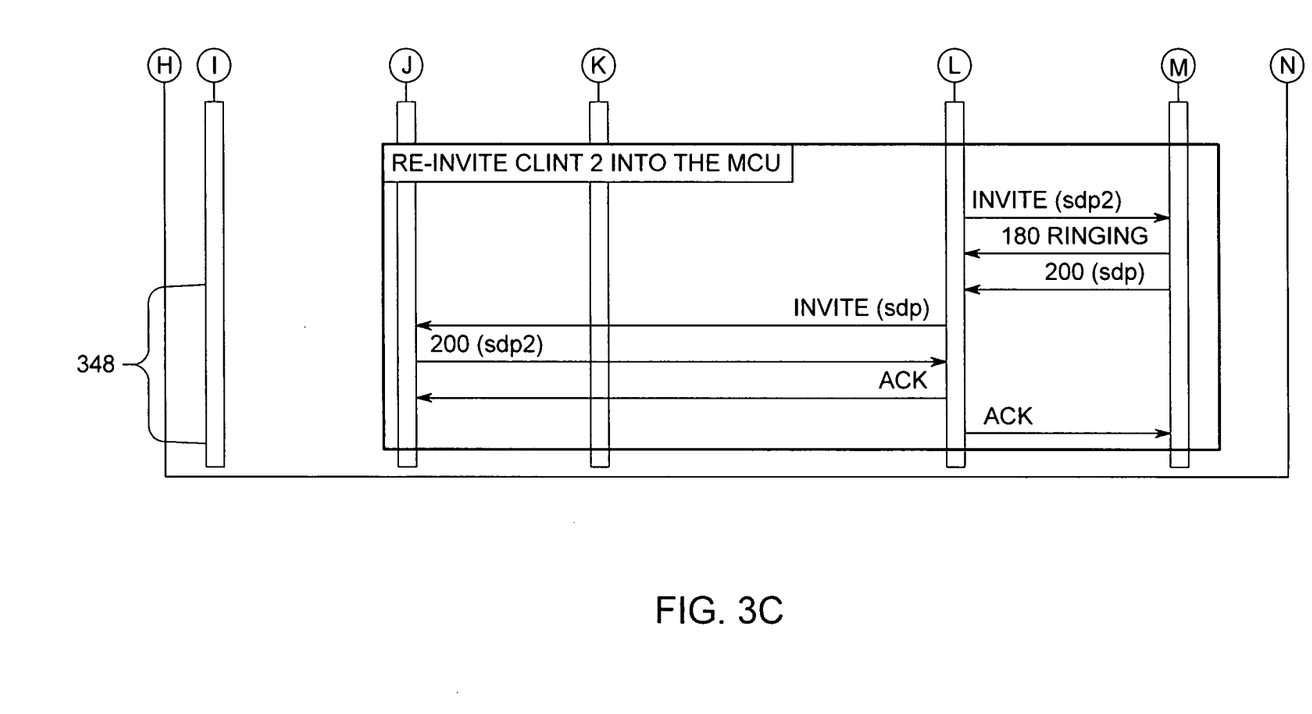

FIGS. 3A-3C depict a flow diagram of allocation process 300 for allocating an MCU for video conferencing in accordance with some embodiments. Allocation process 300 relates to dynamic allocation of MCU resources based on the number of participants in a video conferencing session. In response to a first remote client of a given communication session calling in, step 310, the mediator unit can place the first remote client on hold by responding with an SDP having a recvonly attribute, step 315.

When a second remote client calls into the session, step 320, the session can be converted into a P2P session by having the mediator unit forwarding requests/responses from one client to each other, step 325. In accordance with embodiments, with only two clients engaged in the communication session, the mediator unit performs the interchange between these clients.

Should a third remote client enter the session, step 330, the mediator unit can allocate an MCU for the session. The mediator unit converts the session to an MCU session, step 335. Mediator calls the API of the MCU to allocate a room, and get the room address that can be called in by the client.

The MCU invites remote client 3 into this communication session through the mediator unit, step 340. The MCU invites remote client 1 into this communication session through the mediator unit, step 344. The MCU invites remote client 2 into this communication session through the mediator unit, step 348.

In accordance with embodiments, the mediator unit forwards requests/responses from and between the three remote clients in this session to the assigned MCU. In this way, MCU resources are reserved for the sessions with more than two clients, and the mediator unit dynamically manages the MCU resources.

Figure 4:
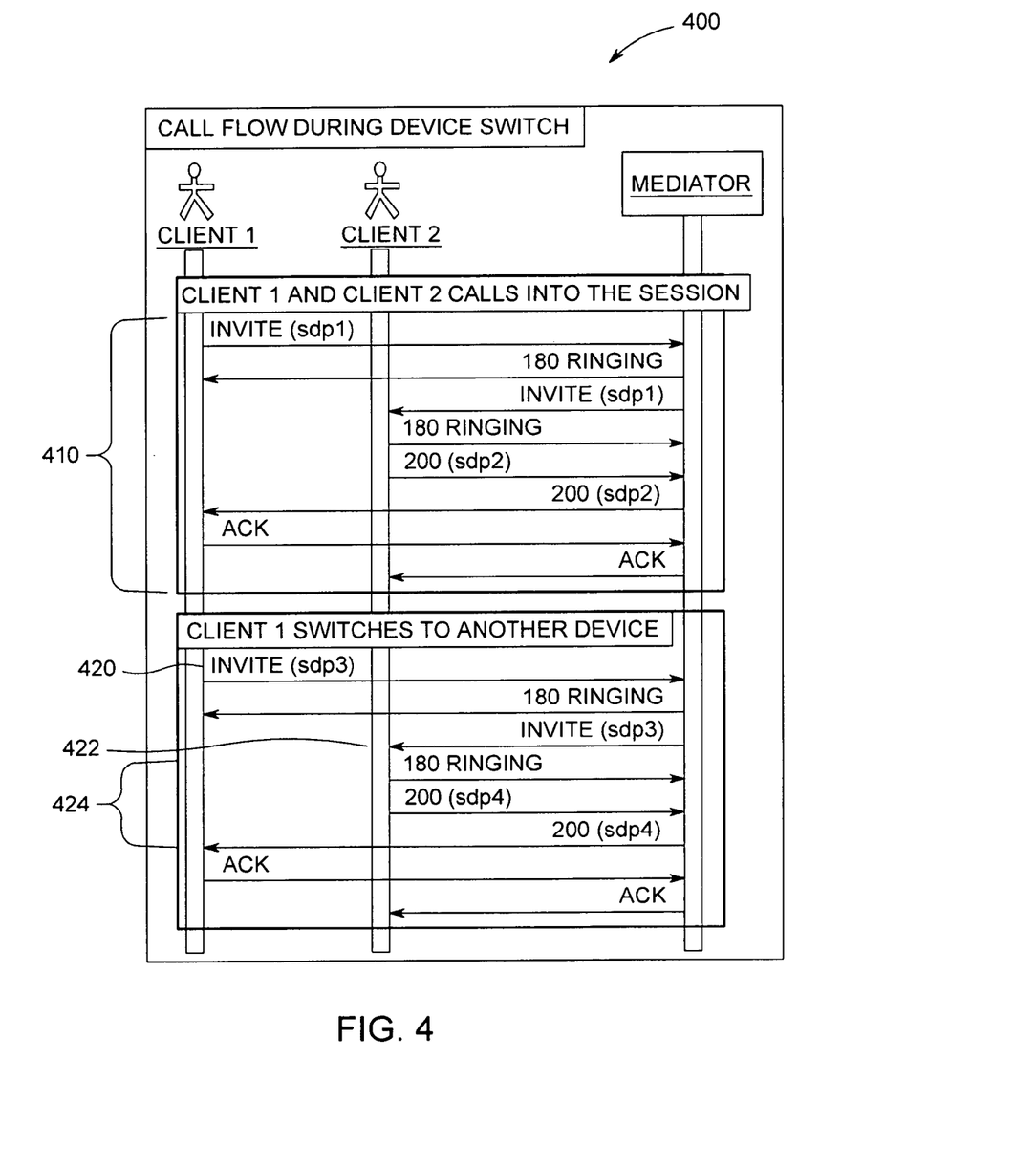
FIG. 4 depicts a flow diagram of a device switch process in accordance with some embodiments.

FIG. 4 depicts a flow diagram of device switch process 400 for supporting multiple communication devices of a remote client in accordance with some embodiments. In accordance with embodiments, should a remote client switch between active communication devices during a communication session (e.g., from a mobile phone to a web browser on a laptop, vice versa, and any other instrumentation change), these devices can be supported while maintaining the existing connection of this remote client to the communication session. FIG. 4 depicts an implementation for a P2P session between two remote clients. However, embodiments are not so limited and communication sessions of more than two remote clients can be implemented.

At step 410, as described above remote client 1 and remote client 2 enter into a communication session. In accordance with embodiments, when one of the remote clients in this communication session switches from one active device to another, step 420, the remote client does not need to hang up the previous connections and reconnect. Instead, the client can simply call into the same session with the same SIP address and with a different SDP. Because the mediator unit maintains a list of clients who are in the session, the mediator unit can detect that this client is an existing participant by checking the session list. The mediator unit automatically updates the session, by sending out a new INVITE with the client's new device SDP to the peer (in a peer-to-peer session) or the MCU (in a conferencing session), step 422 The other remote client(s) of the communication session acknowledge this update to the session, step 424. In this way, neither the client who switches the device, nor the other participant(s) in the session does any extra action to update the session.

Embodying systems and methods provide smart resource allocation of the back-end media infrastructure. The mediator unit allocates an MCU if the number of participants for a session is more than two. The mediator unit detects differences of codecs between the remote clients in the communication session. If there is a difference detected, the mediator unit allocates the resources of a media transcoder. Because the mediator unit detects whether codecs for the remote clients are compatible, the resources of an MCU and a media transcoder are not needed to be allocated for each communication session until an incompatibility is detected. The mediator unit has the knowledge for participants or their supported codecs As noted above, because embodying mediators maintain the session states with each client, the mediator is provided with the information about each participant and their supported codecs. This information can be stored on the memory or disk of the mediator device itself. By allocating resources (i.e., an MCU and/or media transcoder) to a remote communication session only when the number of participants and/or incompatibility of participating remote clients require the resource allocation, the mediator unit reduces the resource consumption of the back-end media infrastructure.

In accordance with embodiments, a generic framework is described that can be applied to any communication application. The adaptation strategies described above are only a few possible use cases, and other adaptation strategies can be developed based on the specific use cases and what kinds of contextual information are available in the application. For example, if network bandwidth information is available, the mediator can dynamically control each remote client's media bandwidth by updating the desired transmission rate on the fly. Further, if a mediator unit has knowledge about the loads on multiple MCUs and/or transcoders, the mediator unit can adjust a communication sessions to archive the best performance of the video infrastructure.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for adaptively controlling the allocation of back-end media infrastructure to communication sessions based on the number of participating remote clients in the communication session and/or an incompatibility of supported media codecs between the participating remote clients, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system to adaptively control multimedia communication sessions, the system comprising:
   a mediator unit in an intermediary communication position between two or more remote clients and a media infrastructure;
   the mediator unit including a receiver, a transmitter and a control processor, the control processor configured to execute instructions that cause the control processor to control the receiver and the transmitter;
   the mediator unit configured to communicate with two or more remote clients across a communication network, the communication network having a server supporting operation of the communication network;
   a first remote client configured to transmit a communication message on the communication network, the communication message initiating a communication session;
   the receiver configured to receive the communication message from the communication network;
   the mediator unit is configured to assign a unique session identifier to the communication message;
   the mediator unit configured to send an empty session description protocol invite message to a second remote client and to receive an invite response from the second remote client;
   the mediator unit configured to determine an existence or nonexistence of compatibility between the first and the second remote clients based on respective protocols of the first remote client communication message and the second remote client invite response;
   if compatibility is nonexistent, then the mediator unit configured to send a modified response to the first remote client and an acknowledge response to the second remote client, the modified response and the acknowledge response each including a same media transcoder's media information;
   wherein a peer to peer communication is bridged between the first and the second remote clients;
   additional remote clients configured to send join requests on the communication network, each join request including the unique session identifier; and
   the mediator unit further configured to act as a back-to-back user agent to pass messages between two remote clients of a two-client communication session.

2. The system of claim 1, the receiver configured to parse session identifier information in the communication message.

3. The system of claim 1, the control processor configured to execute predefined context-sensitive strategies to perform a decision process.

4. The system of claim 3, the predefined context-sensitive strategies including at least one of the number of remote clients in the communication session, bridging incompatible peer-to-peer communications, supporting multiple devices of a single remote client, and dynamic allocation of multipoint control unit resources.

5. The system of claim 1, the mediator unit further configured to apply contextual knowledge of the first and additional clients in a decision process on whether a multipoint control unit is needed to conduct a communication session having three or more remote clients.

6. The system of claim 1, the mediator unit configured to route communication messages between the remote clients.

7. The system of claim 1, the mediator unit configured to proactively process communication sessions based on contextual information of the remote clients and media infrastructure.

8. The system of claim 7, mediator unit configured to at least one of convert a peer-to-peer connection to a multipoint communication session, support a remote client to switch from a first communication device to a second communication device while maintaining the current communication session, and perform media transcoding when remote clients of the same communication session support different codes.

9. A method of contextually adapting a communication session, the method comprising:
   receiving at a mediator unit a first remote client first session description protocol invite call for a peer-to-peer session;
   sending an empty session description protocol invite message to a second remote client;
   receiving from the second remote client a second session description protocol message in response to the empty session description protocol invite message;
   the mediator unit parsing the content of the first session description protocol invite and the content of the second session description protocol to determine an existence or a nonexistence of compatibility between the first and the second remote clients based on respective protocols of the first session description protocol invite and the second session description protocol message;
   if compatibility is nonexistent, then the mediator unit configured to send a modified response to the first remote client and an acknowledge response to the second remote client, the modified response and the acknowledge response each including a same media transcoder's media information; and
   the mediator unit initializing the peer-to-peer session without a media transcoder involved in the initialization.

10. The method of claim 9, including the mediator unit determining if the result of the parsing step indicates an incompatibility between the first and the second remote clients.

11. A method of allocating a multipoint communication unit for a video communication, the method comprising:
   receiving at a mediator unit a request from a first remote client to join a video communication;
   the mediator unit placing the first remote client on hold;
   the mediator unit sending an empty session description protocol invite message to a second remote client;
   receiving at the mediator unit an invite response from a second remote client to join the video communication;
   the mediator unit determining an existence or nonexistence of compatibility between the first and the second remote clients based on respective protocols of the first remote client request and the second remote client invite response;
   if compatibility is nonexistent, then the mediator unit sending a modified response to the first remote client and an acknowledge response to the second remote client, the modified response and the acknowledge response each including a same media transcoder's media information; and initiating the video communication by the mediator unit between the first and the second remote clients in a peer-to-peer session.

12. The method of claim 11, including placing the first remote client on hold by responding with a session description protocol having a recvonly attribute.

13. The method of claim 11, including:
receiving a request from a third remote client to join the video communication;
the mediator unit allocating a multipoint communication unit to the video communication in response to the third remote client request; and
the mediator unit converting the peer-to-peer session to a multipoint communication unit session.

14. The method of claim 13, the multipoint communication unit inviting the first, the second, and the third remote client to the multipoint communication unit session through the mediator unit.

* * * * *